UNITED STATES PATENT OFFICE.

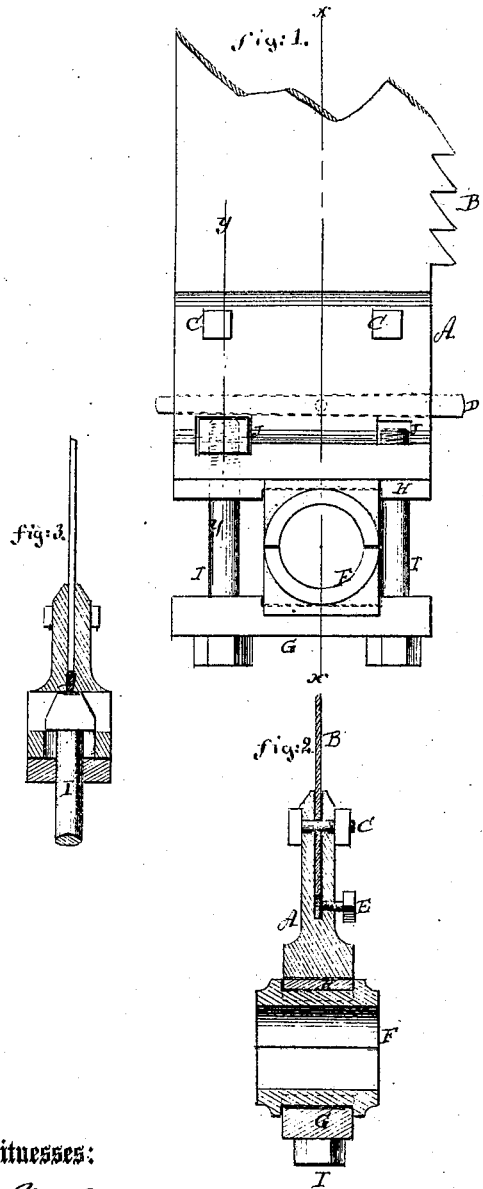

DANIEL CILLEY, OF OSCEOLA MILLS, PENNSYLVANIA.

IMPROVEMENT IN MULEY-SAW HANGINGS.

Specification forming part of Letters Patent No. 105,174, dated July 12, 1870.

*To all whom it may concern:*

Be it known that I, DANIEL CILLEY, of Osceola Mills, in the county of Clearfield and State of Pennsylvania, have invented a new and Improved Muley-Saw Head; and I do hereby declare that the following is a full, clear, and exact description thereof, which will enable others skilled in the art to make and use the same, reference being had to the accompanying drawing, forming part of this specification.

This invention consists in the manner of holding the head-pin box, the manner of securing and holding the saw, and the manner of adjusting and ranging the saw.

In the accompanying drawing, Figure 1 is a side view of the head with the saw attached. Fig. 2 is a section of Fig. 1 on the line $x\,x$. Fig. 3 is a section of Fig. 1 on the line $y\,y$, showing the manner of adjusting or ranging the saw.

Similar letters of reference indicate corresponding parts.

A is the block in which the saw B is held. This block is slotted for the saw, as seen in Fig. 2, where the saw is held by the bolts C C, which pass through the saw. D is a key in the bottom of the slot. The end of the saw rests upon this key. By driving it all longitudinal movement of the saw is prevented, and all wear is compensated for. This key is held by the set-screw E. F is the box, which is confined between the two plates G H by the bolts I I. The box is kept in place on the plates by shoulders formed in both box and plates, as indicated in Fig. 1. The bolts pass up into the block A, through which block are transverse recesses for screw-nuts on the ends of the bolts, as seen in the drawing. J J represent these nut-recesses. The bolt-hole from the plate H to the nut-recesses J at the rear end of the block A is slotted, so that the block may be moved laterally for ranging the saw. This slot-hole is seen in the section, Fig. 3.

When the saw is properly adjusted the bolt I holds the block rigidly to its place either to the right or left.

It will be seen that by this mode of constructing a muley-saw head the saw and the box are most securely held together, and that the saw can be ranged to a nicety in the most simple and efficient manner.

Having thus described my invention, I claim as new and desire to secure by Letters Patent—

1. The saw-buckle A, slotted beneath the nut-recess J and plate H, for the purpose of varying the lateral range of the saw, as shown and described.

2. The combination of buckle A, key D, plates G H, and bolts I I, all relatively arranged as and for the purpose specified.

DANIEL CILLEY.

Witnesses:
J. B. MORIN,
JNO. LAWSHE.